United States Patent
George et al.

(10) Patent No.: US 10,031,682 B1
(45) Date of Patent: Jul. 24, 2018

(54) METHODS FOR IMPROVED DATA STORE MIGRATIONS AND DEVICES THEREOF

(71) Applicant: NetApp, Inc., Sunnyvale, CA (US)

(72) Inventors: Tijin George, Sunnyvale, CA (US); Cheryl Thompson, Sunnyvale, CA (US); Ananthan Subramanian, San Ramon, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 15/581,742

(22) Filed: Apr. 28, 2017

(51) Int. Cl.
*G06F 3/06* (2006.01)

(52) U.S. Cl.
CPC .......... *G06F 3/0619* (2013.01); *G06F 3/067* (2013.01); *G06F 3/0647* (2013.01); *G06F 3/0665* (2013.01); *G06F 3/0689* (2013.01)

(58) Field of Classification Search
CPC ...... G06F 3/0619; G06F 3/0647; G06F 3/067; G06F 3/0659; G06F 3/0689
USPC ...................................................... 711/155
See application file for complete search history.

(56) References Cited

U.S. PATENT DOCUMENTS

| | | | |
|---|---|---|---|
| 2003/0115439 A1* | 6/2003 | Mahalingam | G06F 17/30079 712/1 |
| 2014/0351388 A1* | 11/2014 | Srinivasan | H04L 67/1097 709/219 |
| 2016/0077975 A1* | 3/2016 | Stabrawa | G06F 3/0604 711/209 |
| 2017/0235741 A1* | 8/2017 | Batts | G06F 17/30073 707/672 |
| 2017/0235802 A1* | 8/2017 | Vully | G06F 17/30079 707/809 |
| 2017/0285997 A1* | 10/2017 | Stabrawa | G06F 3/0632 |

* cited by examiner

*Primary Examiner* — Than Vinh Nguyen
(74) *Attorney, Agent, or Firm* — LeClairRyan PLLC (57) ABSTRACT

A method, non-transitory computer readable medium, and computing device that receives metadata for a block associated with an object from a source storage node. The metadata comprises a source object identifier and the object is associated with a source volume of a source aggregate owned by the source storage node. A determination is made when another block associated with the object has been previously received. A destination object identifier is obtained based on the source object identifier, when the determining indicates that the other block associated with the object has been previously received. A new aggregate block number is assigned to the block based on the destination object identifier and another portion of the metadata. Ownership of the source volume is transferred upon receipt of an indication of a cutover from the source storage node in order to migrate the source volume to a destination volume of a destination aggregate.

18 Claims, 5 Drawing Sheets

METHODS FOR IMPROVED DATA STORE MIGRATIONS AND DEVICES THEREOF

FIELD

This technology relates to managing data storage networks, and more particularly to methods and devices for migrating data stores, such as volumes of composite aggregates, between storage nodes in a data storage network.

BACKGROUND

Storage nodes or servers in storage networks generally store data across multiple data storage devices that together comprise a data container, which is also referred to herein as an aggregate. Storage nodes may employ various forms of local data storage devices, such as hard disk drives, solid state drives, flash drives, or tape devices, as well as remote data storage devices, such as cloud storage devices or repositories for example.

Typically, the data storage devices host one or more data stores or volumes within the aggregates, which are associated with file systems that define an overall logical arrangement of storage space in a storage network. Volumes can be established to have tiering policies in order to store data in multiple performance tiers. For example, composite aggregates can include volumes that span relatively high performance flash data storage devices and relatively low performance cloud storage devices for warmer and colder data, respectively.

To improve performance of a storage network, volumes are often transitioned or migrated from aggregates owned by source storage nodes to aggregates owned by destination storage nodes. In order to facilitate the migration, source storage nodes read data to be migrated, copy the data, transfer the copy of the data to a destination storage node to be stored in a volume of aggregate owned by the destination storage node, and remove the data subsequent to the transfer. While reading data stored in a local flash data storage device, for example, can be relatively quick, reads directed to cloud storage devices are relatively slow. Accordingly, many volume transfers currently require a significant amount of time, particularly for volumes in which data is stored in a cloud storage device.

In one particular example, migrations for composite aggregates that utilize cloud storage may otherwise proceed relatively quickly with respect to the subset of the data stored in a higher performance tier, but currently requires a significant amount of time due to read and copy of another subset of the data stored in a lower performance, cloud data storage tier. Moreover, cloud service providers generally charge based on utilization and there can be significant monetary transaction costs associated with storage operations that require accessing cloud storage.

DETAILED DESCRIPTION

Figure 1:
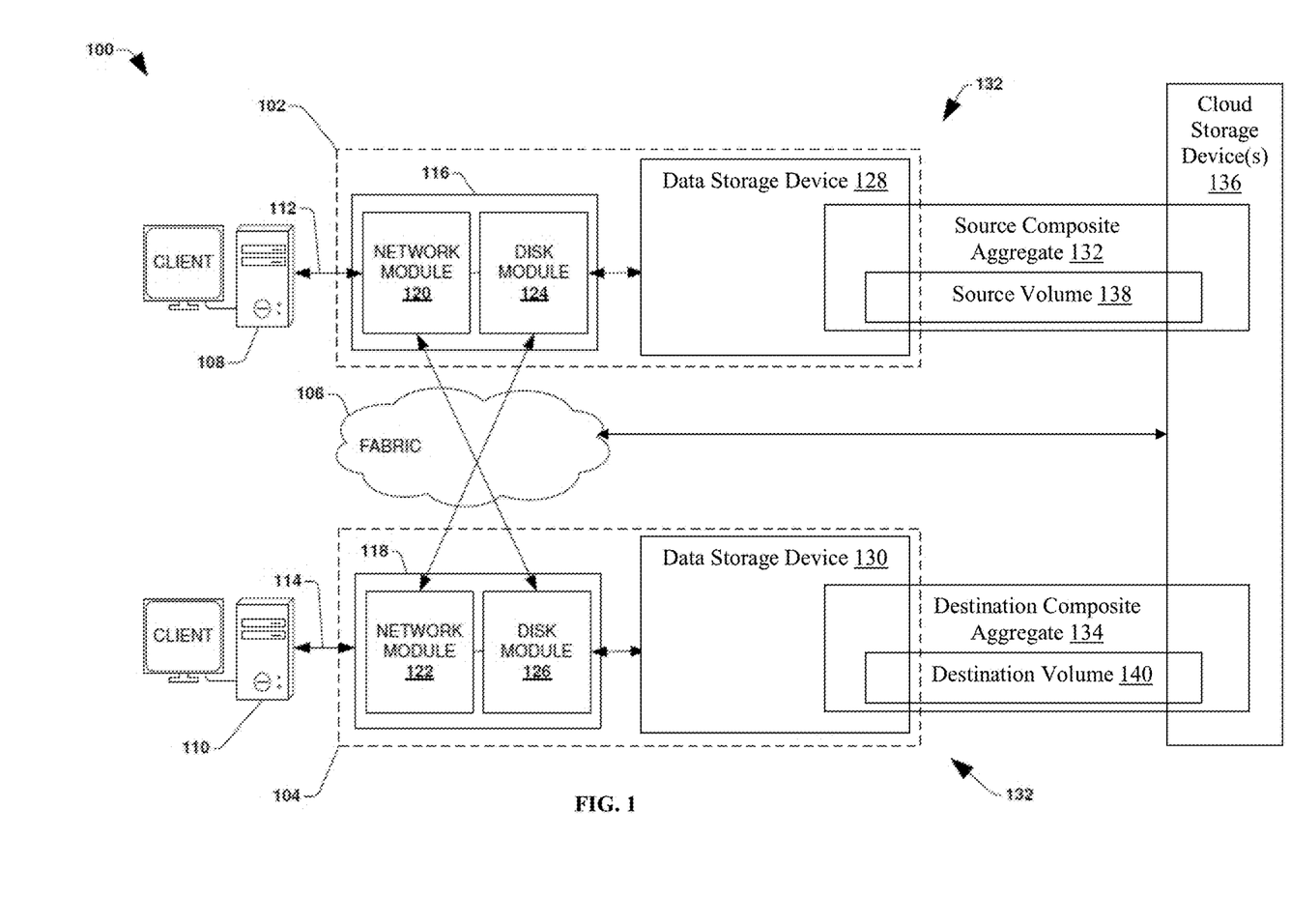
FIG. 1 is a block diagram of a network environment with exemplary source and destination storage node computing devices.

FIG. 1 is a block diagram illustrating a clustered network environment 100 that may implement one or more aspects of the technology described and illustrated herein. The clustered network environment 100 includes source and destination data storage systems or computing devices 102 and 104 that are coupled over a cluster fabric 106, such as a computing network embodied as a private Infiniband, Fibre Channel (FC), or Ethernet network facilitating communication between the source and destination data storage systems 102 and 104 (and one or more modules, component, etc. therein, such as, nodes 116 and 118, for example). It will be appreciated that while two data storage systems 102 and 104 and source and destination nodes 116 and 118 are illustrated in FIG. 1, any suitable number of such components is contemplated. This technology provides a number of advantages including methods, non-transitory computer readable media, and devices that facilitate data store migrations without requiring that migrated data be read, copied, and physically moved to a destination, thereby reducing the duration and expense of the transfer.

In this example, source and destination nodes 116 and 118 include storage controllers (e.g., source node 116 may be a primary or local storage controller and destination node 118 may be a secondary or remote storage controller) that provide client devices, such as host devices 108 and 110, with access to data stored within local data storage devices 128 and 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include source and destination data storage systems (e.g., 102 and 104) residing in a same geographic location (e.g., in a single onsite rack of data storage devices).

In the illustrated example, one or more of the host devices 108 and 110, which may comprise, for example, client devices, personal computers (PCs), computing devices used for storage (e.g., storage servers), and other computers or peripheral devices (e.g., printers), are coupled to the respective source and destination data storage systems 102 and 104 by storage network connections 112 and 114. Network connections 112 and/or 114 may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the host devices 108 and 110 may be general-purpose computers running applications, and may interact with the source and destination data storage systems 102 and 104 using a client/server model for exchange of information. That is, the host devices 108 and 110 may request data from the source and destination data storage systems 102 and 104 (e.g., data on a storage device managed by a network storage control configured to process I/O commands issued by the host devices 108 and 110 for the storage device), and the source and destination data storage systems 102 and 104 may return results of the request to the host devices 108 and 110 via the storage network connections 112 and 114.

The source and destination nodes 116 and 118 on source and destination data storage systems 102 and 104 can include network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria.

In an example, a first cluster of nodes such as the source and destination nodes 116 and 118 may be located on a first storage site. A second cluster of nodes, not illustrated, may be located at a second storage site. The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site). In other examples, the second cluster of nodes can be configured according to an archival configuration and/or the first and second clusters of nodes can be configured based on another type of replication arrangement (e.g., for load sharing purposes).

As illustrated in the clustered network environment 100, source and destination nodes 116 and 118 can comprise various functional components that coordinate to provide a distributed storage architecture for the cluster. For example, the source and destination nodes 116 and 118 can include network modules 120 and 122 and disk modules 124 and 126. Network modules 120 and 122 can be configured to allow the source and destination nodes 116 and 118 (e.g., network storage controllers) to connect with host devices 108 and 110 over the storage network connections 112 and 114, for example, allowing the host devices 108 and 110 to access data stored in the distributed storage system. Further, the network modules 120 and 122 can provide connections with one or more other components through the cluster fabric 106. For example, in FIG. 1, the network module 120 of source node 116 can access the data storage device 130 by sending a request through the disk module 126 of destination node 118.

Disk modules 124 and 126 can be configured to connect data storage devices 128 and 130, such as disks or arrays of disks, flash memory, or some other form of data storage, to the source and destination nodes 116 and 118. The source and destination nodes 116 and 118 can be interconnected by the cluster fabric 106, for example, allowing respective nodes in the cluster to access data on data storage devices 128 and 130 connected to different nodes in the cluster. Often, disk modules 124 and 126 communicate with the data storage devices 128 and 130 according to the SAN protocol, such as SCSI or FCP, for example. Thus, as seen from an operating system on source and destination nodes 116 and 118, the data storage devices 128 and 130 can appear as locally attached to the operating system. In this manner, different source and destination nodes 116 and 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, one or more of the host devices 108 and 110 can be networked with the source and destination nodes 116 and 118 in the cluster, over the storage networking connections 112 and 114. As an example, respective host devices 108 and 110 that are networked to a cluster may request services (e.g., exchanging of information in the form of data packets) of source and destination nodes 116 and 118 in the cluster, and the source and destination nodes 116 and 118 can return results of the requested services to the host devices 108 and 110. In one embodiment, the host devices 108 and 110 can exchange information with the network modules 120 and 122 residing in the nodes 116 and 118 (e.g., network hosts) in the source and destination data storage systems 102 and 104.

In one example, the source and destination storage systems 102 and 104 host source and destination composite aggregates 132 and 134, although any number of composite aggregates can be maintained by the source and destination storage systems 102 and 104. The source and destination composite aggregates 132 and 134 correspond to physical local and remote data storage devices, such as local flash storage and remote disk storage in cloud storage device(s) 136, for example, although the source and destination composite aggregates 132 and 134 can include any other types of data storage devices.

The source and destination composite aggregates 132 and 134 include source and destination volumes 138 and 140 in this example, although any number of volumes can be included in the source and destination composite aggregates 132 and 134. The source and destination volumes 138 and 140 are virtual data stores that define an arrangement of storage and one or more file systems within the network environment 100. While the examples described and illustrated herein are with respect to composite aggregates 132 and 134 including source and destination volumes 138 and 140 with data stored locally at the source and destination storage systems 102 and 104 as well as remotely at the cloud storage device(s) 140, this technology can also be used for other types of aggregates and volumes that do not employ tiered storage.

Volumes, including source and destination volumes 138 and 140, can span a portion of a disk, a collection of disks, or portions of disks, for example, and typically define an overall logical arrangement of file storage on disk space in the storage system. In one example a volume can comprise stored data as one or more files or objects that reside in a hierarchical directory structure within the volume. Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In an example, the cloud storage device(s) 140 include a processor, a memory, and a communication interface, which are all coupled together by a bus or other communication link, although the cloud storage device(s) 140 can have other types and numbers of components or other elements. One or more of the cloud storage device(s) 140 can be a server computing device or any other type of storage device configured to store large quantities of files or objects at the direction of the source and destination storage systems 102 and 104.

Figure 2:
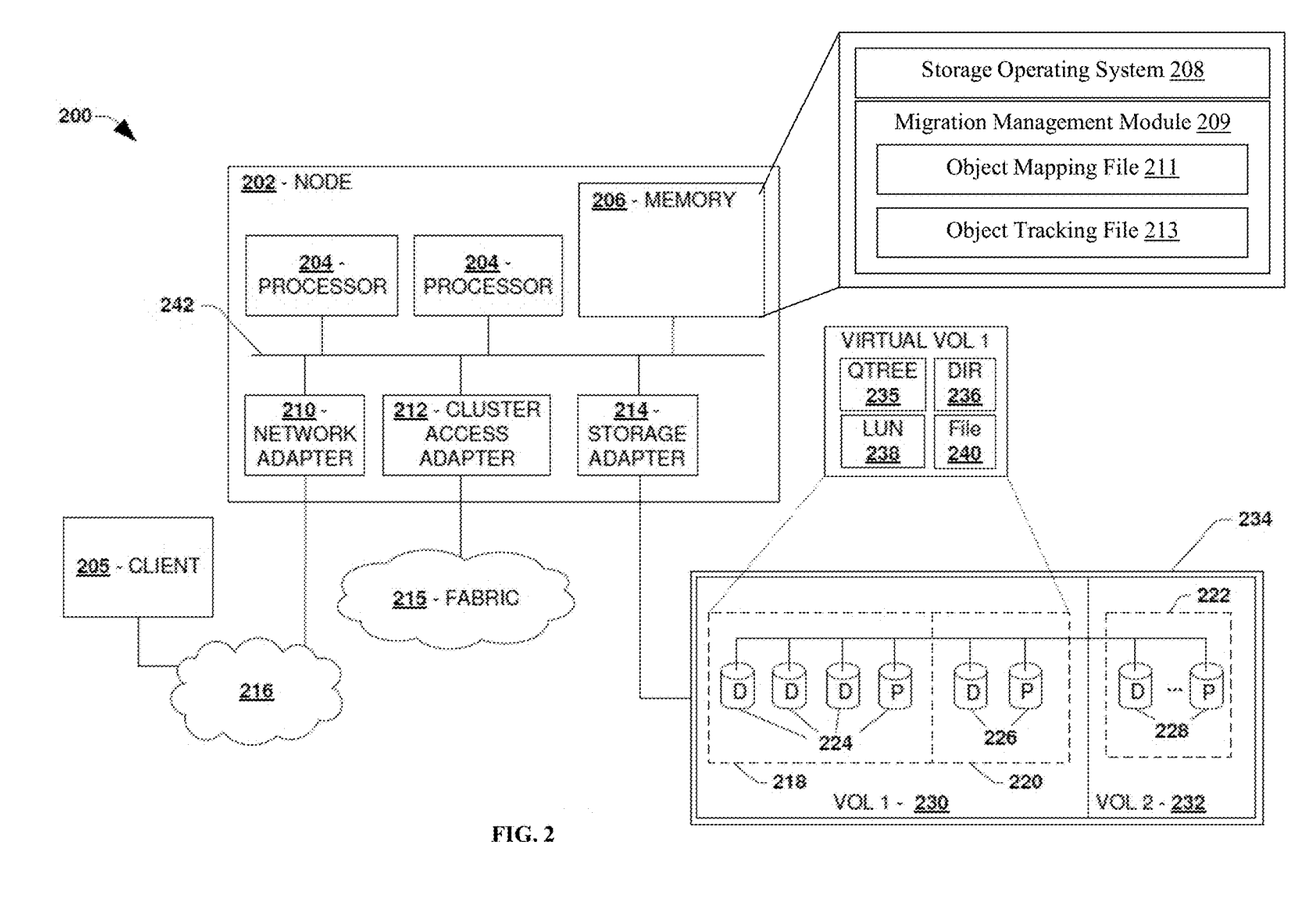
FIG. 2 is a block diagram of an exemplary one of the storage node computing devices shown in FIG. 1.

FIG. 2 is an illustrative example of a data storage system or computing device 200 (e.g., 102 or 104 in FIG. 1), providing further detail of an embodiment of components that may implement the technology described and illustrated herein. The data storage system 200 comprises a node 202 (e.g., node 116 or 118 in FIG. 1), and a data storage device 234 (e.g., data storage devices 128 or 130 in FIG. 1). A host device 205 (e.g., 108 or 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, and 228 of a disk array 218, 220, and 222. It will be appreciated that the techniques and systems, described herein, are not limited by the example embodiment. For example, disks 224, 226, and 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system 200, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, and 214 for storing related software application code and data structures. The processors 204 and adapters 210, 212, and 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

In this particular example, the memory 206 a migration management module 209, although other types and/or numbers of applications or modules can also be included in other examples. The migration management module 209 in this example is configured to transition a data store, such as the source volume 138 to another storage node in the network environment 100. Generally, the migration management module 209 facilitates a transfer of ownership of the source volume 138 from the source node 116 to the destination node 118 without physically moving at least user data stored in the cloud storage device(s) 136, as described and illustrated in more detail later.

The migration management module 209 in this example includes an object mapping file 211 and an optional object tracking 213, although other types of data storage types such as tables or databases can also be used. The object mapping file 211 includes a correlation of source object identifiers to destination object identifiers, which allows blocks associated with the source objects to be named appropriately when received in out-of-order batches by the destination node 118, also as described and illustrated in more detail later.

The optional object tracking file 213 is used by the source node 116 to maintain a list of source object identifiers that can efficiently marked as available to be freed subsequent to a transfer of the source volume 138. Objects as used herein refers to any collection of blocks, including files or other structures, wherein the blocks are any type of structure that are smaller than and include only a portion of the objects. In one example, an object is a collection of 1024 4 kb blocks, although any other type and number of objects or blocks can also be used.

The network adapter 210 in this example includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108 or 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller).

The information may be stored on any type of attached array of writeable media such as magnetic disk drives, flash memory, and/or any other similar media adapted to store information.

In the example data storage system 200, the information can be stored in data blocks on the disks 224, 226, and 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, to facilitate access to data stored on the disks or other structures 224, 226, and 228 of the data storage devices 128 and 130 and/or the cloud storage device(s) 136, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files or objects within physical and/or virtual volumes, including source and destination volumes 138 and 140, which can be associated with respective volume identifiers, such as file system identifiers (FSIDs), which can be 32-bits in length in one example. A physical volume corresponds to at least a portion of physical storage devices whose address, addressable space, location, etc. does not change, such as at least some of one or more data storage devices 128 and 130 or cloud storage device(s) 136 (e.g., a Redundant Array of Independent (or Inexpensive) Disks (RAID system)). Typically the location of the physical volume does not change in that the (range of) address(es) used to access it generally remains constant.

A virtual volume, in contrast, is stored over an aggregate of disparate portions of different physical storage devices. The virtual volume, such as source and destination volumes 138 and 140, may be a collection of different available portions of different physical storage device locations, such as some available space from each of the disks 224, 226, and/or 228 for example. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 3:
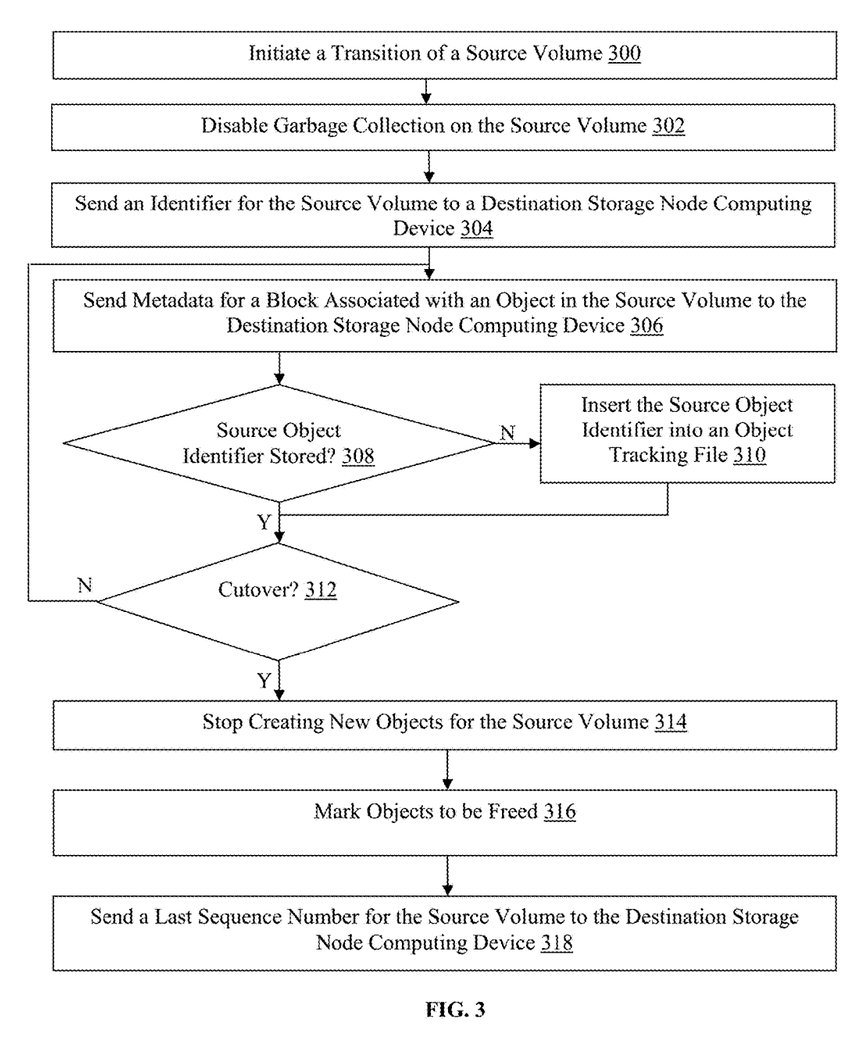
FIG. 3 is a flowchart of an exemplary method for facilitating improved data store migrations by the exemplary source storage node computing device shown in FIG. 1.

Referring to FIGS. 1-3, an exemplary method for facilitating improved data store migrations by the exemplary source node 116 is illustrated. In step 300 in this particular example, the source node 116 initiates a transition of the source volume 138 to the destination node 118. The source node 116 can initiate the transition of the source volume 138 in response to instructions received from an administrator or based on an automated process and current network conditions, for example. The source volume 138 in this example includes data stored in the form of blocks organized by objects, in both one or more of the data storage device 128 and the cloud storage device(s) 136, although other types of volumes with data stored in other locations and in different forms can also be used.

In step 302, the source node 116 optionally disables garbage collection on the source volume 138. By disabling garbage collection, complexity is reduced and the migration management module 38 does not have to keep track of which objects and/or blocks may have been freed during the transition.

In step 304, the source node 116 sends a notification of the transition, which includes an indication of the source volume 138, to the destination node 118. Other information can also be exchanged between the source and destination nodes 116 and 118 as part of initiating the transition of the source volume 138 in steps 300-304.

In step 306, the source node 116 sends metadata for a portion of an object, referred to herein as a block, in the source volume 138 to the destination node 118. The metadata in this example includes at least a source object identifier and an offset, also referred to as a slot number, corresponding to a physical location of the data corresponding to the block in the data storage device 128 or one of the cloud storage device(s) 136.

In other examples, the metadata can also include a virtual volume block number, a sequence number, or other information associated with the block. The block associated with the metadata can be identified randomly or based on a stored algorithm or policy, for example. Although metadata for one block is sent in step 306 for purposes of this example, metadata for more than one block can also be sent, such is in a batch, in other examples.

In step 308, the source node 116 determines whether the source object identifier in the metadata is already stored in the object tracking file 213. If the source object identifier is already stored in the object tracking file 213, then the source node 116 has previously sent metadata for another block associated with the same object to the destination node 118. However, in at least a first iteration, the source node 116 will determine that the source object identifier is not stored in the object tracking file 213 and then the No branch is taken to step 310.

In step 310, the source node 116 inserts the source object identifier into the object tracking file 213. By maintaining the object identifier associated with objects for which metadata for corresponding blocks has been sent to the destination node 118, the source node 116 is more efficiently able to determine which object identifiers are associated with objects in the source volume 138 that were not transferred (e.g., because they are associated with user data deleted subsequent to initiation of the transition of the source volume 138) and that can be freed, as described and illustrated in more detail later. Subsequent to inserting the source object identifier in step 310, or if the source node 116 determines that the source object identifier was already stored and the No branch is taken from step 308, the source node 116 proceeds to step 312.

In step 312, the source node 116 determines whether to initiate a cutover or transition of ownership of the source volume 138 to the destination node 118. In one example, the source node 116 can determine whether metadata for the remaining objects to be transferred is below a threshold size such that a final transfer can proceed within a timeout duration of the host devices 108 and 110. In another example, the source node 116 can also determine whether there is any metadata for any remaining objects to be transferred. If the source node 116 determines that a cutover should not be initiated, then the No branch is taken back to step 306. However, if the source node 116 determines that a cutover should be initiated, then the Yes branch is taken to step 314.

In step 314, the source node 116 stops creating new objects in the source volume 138. New object may be created in response to received write requests from the host devices 108 and 110, for example. The source node 116 can also suspend any operations received from the host devices 108 and 110, which can be redirected to the destination node 118 after transfer of ownership of the source volume 138.

In step 316, the source node 116 marks objects to be freed. In one example, the source node 116 can mark objects associated with source object identifiers that are in the source volume 138, but are not included in the object tracking file 213. Source object identifiers can be in the source volume 138 but not included in the object tracking file 213 if the associated data was deleted by storage operations received from one of the client devices 14(1)-14(n) or an internally-generated storage operation subsequent to initiation of the transition of the source volume 138. By marking the object, the blocks and inodes associated with the objects can be removed from the file system that is visible to the host devices 108 and 110 synchronously, and lazily or asynchronously deleted from the data storage device 128 and/or cloud storage device(s) 136.

In step 318, the source node 116 sends a last sequence number for the source volume 138 to the destination node 118 as part of a communication indicating that a cutover has occurred. In this example, the objects in the source volume 138 are each associated with a monotonically increasing sequence number, which is part of the metadata sent to the destination node 118 in step 306. By sending the last object sequence number, the destination node 118 can avoid overwriting data and can appropriately determine the next sequence number to assign.

The source node 116 optionally also updates an entry of a database of the cluster associated with the source and destination nodes 116 and 118 in order to transition the source volume 138. The entry in the database can correspond with the volume identifier sent in step 304 and the source node 116 can remove a reference to itself as the owner of volume associated with the volume identifier, for example.

Additionally, the source node 116 can subsequently redirect any operations received from the host devices 108 and 110 and suspended to the destination node 118 to be processed. In other examples, one or more of steps 300-318 can be performed in a different order and other steps can also be performed by the source node 116 as part of migrating the source volume 138 to the destination node 118.

Figure 4:
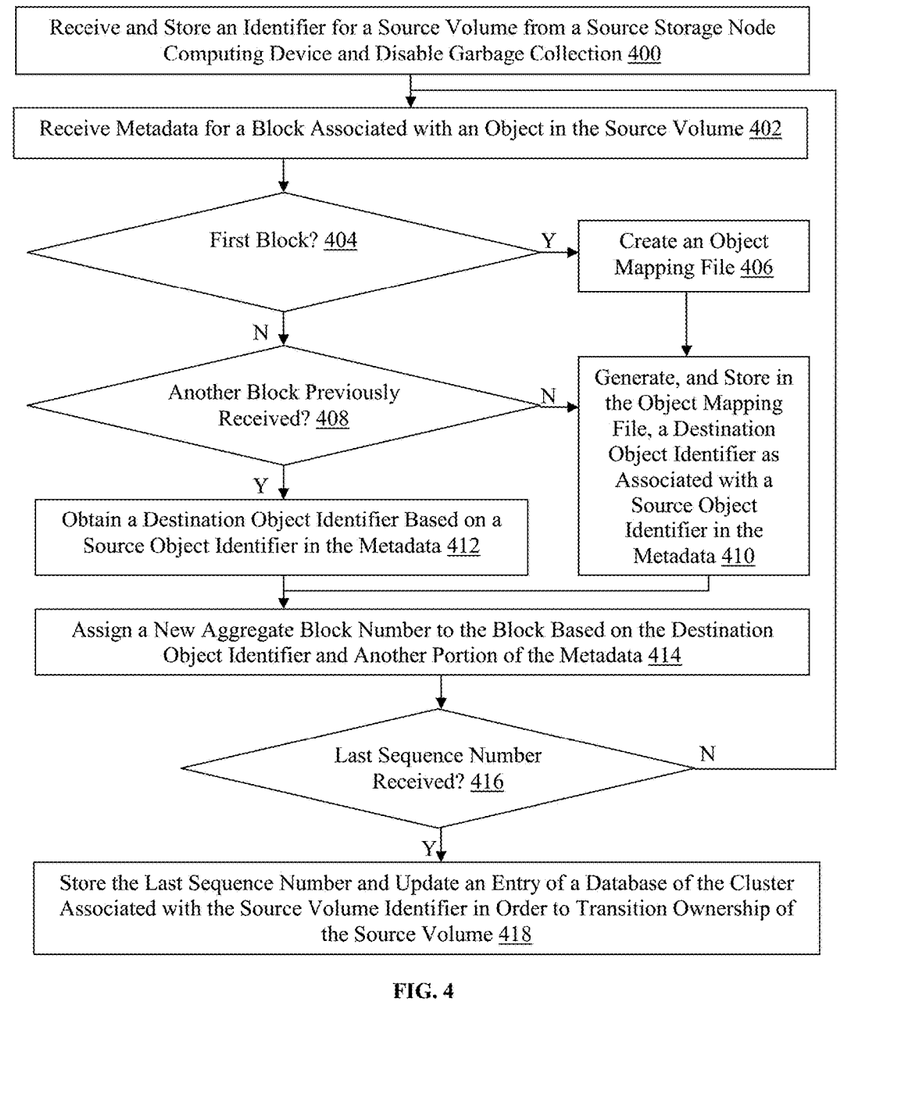
FIG. 4 is a flowchart of an exemplary method for facilitating improved data store migrations by the exemplary destination storage node computing device shown in FIG. 1.

Referring to FIGS. 1, 2 and 4, an exemplary method for facilitating improved data store migrations by the exemplary destination node 118 is illustrated. In step 400 in this particular example, the destination node 118 receives an indication of a volume transfer from the source node 116, which includes an identifier for the source volume 138. The destination node 118 optionally generates the destination volume 140, stores the identifier for the source volume 138, and/or disables garbage collection for the destination volume 140 in response to the indication of the volume transfer.

In step 402, the destination node 118 receives metadata for a block associated with an object in the source volume 138. The metadata includes at least a source object identifier for the object and an offset corresponding to the block, although other information can also be included in the metadata.

In step 404, the destination node 118 determines whether the block is the first block associated with the source volume 138 that the destination node 118 has received from the source node 116. If the destination node 118 determines that the block is the first block, then the Yes branch is taken to step 406.

In step 406, the destination node 118 creates the object mapping file 211, which holds a mapping of source object identifiers to destination object identifiers. The destination node 118 optionally updates an entry of a cluster-wide database corresponding to the source volume identifier to indicate that ownership of the source volume 138 is currently shared or in the process of being transferred.

The destination node 118 cannot reuse the same object identifiers as used by the source node 116 because they may already be in use at the destination node 118. The destination node 118 utilizes the object mapping file 211 to identify blocks associated with the source volume 138 that are sent randomly and out-of-order with respect to the corresponding objects, as described and illustrated in more detail later. Referring back to step 404, if the destination node 118 determines that the block is not the first block received from the source node 116 for the source volume 138, then the No branch is taken to step 408.

In step 408, the destination node 118 determines whether another block has previously been received for the same object. In order to determine whether another block has been previously received, the destination node 118 determines whether the source object identifier extracted from the metadata received in step 402 is stored in the object mapping file 211. If the destination node 118 determines that another block has not been previously received for the same object and the No branch is taken, or subsequent to creating the object mapping file 211 in step 406, the destination node 118 proceeds to step 410.

In step 410, the destination node 118 generates a destination object identifier and stores the generated destination object identifier in the object mapping file 211 as associated with the source object identifier extracted from the metadata received in step 402. Accordingly, a new destination object identifier is allocated by the destination node 118 if the block corresponding to the received metadata is the first block received from the source volume 138 or the first block of a particular object from the source volume 138. Referring back to step 408, the destination node 118 determines that another block associated with the same object was previously received, then the Yes branch is taken to step 412.

In step 412, the destination node 118 obtains a destination object identifier based on the source object identifier extracted from the metadata received in step 402. Accordingly, the destination object identifier is retrieved from the object mapping file 211 based on a mapping of the destination object identifier to the source object identifier. The mapping could have been stored as described and illustrated earlier in step 410.

Accordingly, the destination node 118 in this example is able to associate blocks of the same object with a destination object identifier using the object mapping file 211 irrespective of the order that the blocks are received from the source node 116. Subsequent to obtaining the destination object identifier in step 412, or generating the destination object identifier in step 410, the destination node 118 proceeds to step 414.

In step 414, the destination node 118 assigns a new aggregate block number to the block based on the destination object identifier and another portion of the metadata, such as the offset. Accordingly, the aggregate block number for each of the blocks associated with a same object includes the destination object identifier, as maintained and determined via the mapping with a source object identifier in the object mapping file 211.

In step 416, the destination node 118 determines whether a last sequence number has been received from the source node 116, although other methods of communicating a cutover or the end of the transfer of the source volume 138 can also be used in other examples. The last sequence number is the highest sequence number associated with an object in the source volume 138 and is included in the metadata for each block in this example.

If the destination node 118 determines that a last sequence number has not been received from the source node 116, then the No branch is taken back to step 402 and the destination node 118 again receives metadata from the source node 116. However, if the destination node 118 determines that a last sequence number has been received from the source node 116 in this example, then the destination node 118 proceeds to step 418.

In step 418, the destination node 118 stores the last sequence number and updates an entry of a cluster-wide database associated with the source volume identifier received in step 400 in order to transition ownership of the source volume 138. Accordingly, the destination volume 140 stores the data from the source volume 138 without any of the data being read and copied and by exchanging only metadata between the source and destination nodes 116 and 118. Advantageously, blocks associated with each particular object have corresponding aggregate block numbers that accurately identify the associated object in the destination volume 140.

In some examples, the destination node 118 receives operations from the source node 116 that were received from the host device 108 by the source node 116 during the transfer of the source volume 138. Subsequent to transferring ownership of the source volume 138 via the cluster-wide database, the destination storage volume can enable garbage collection for the destination volume 140 and optionally remove the object mapping file 211, and/or the contents thereof, from the memory 28.

Figure 5:
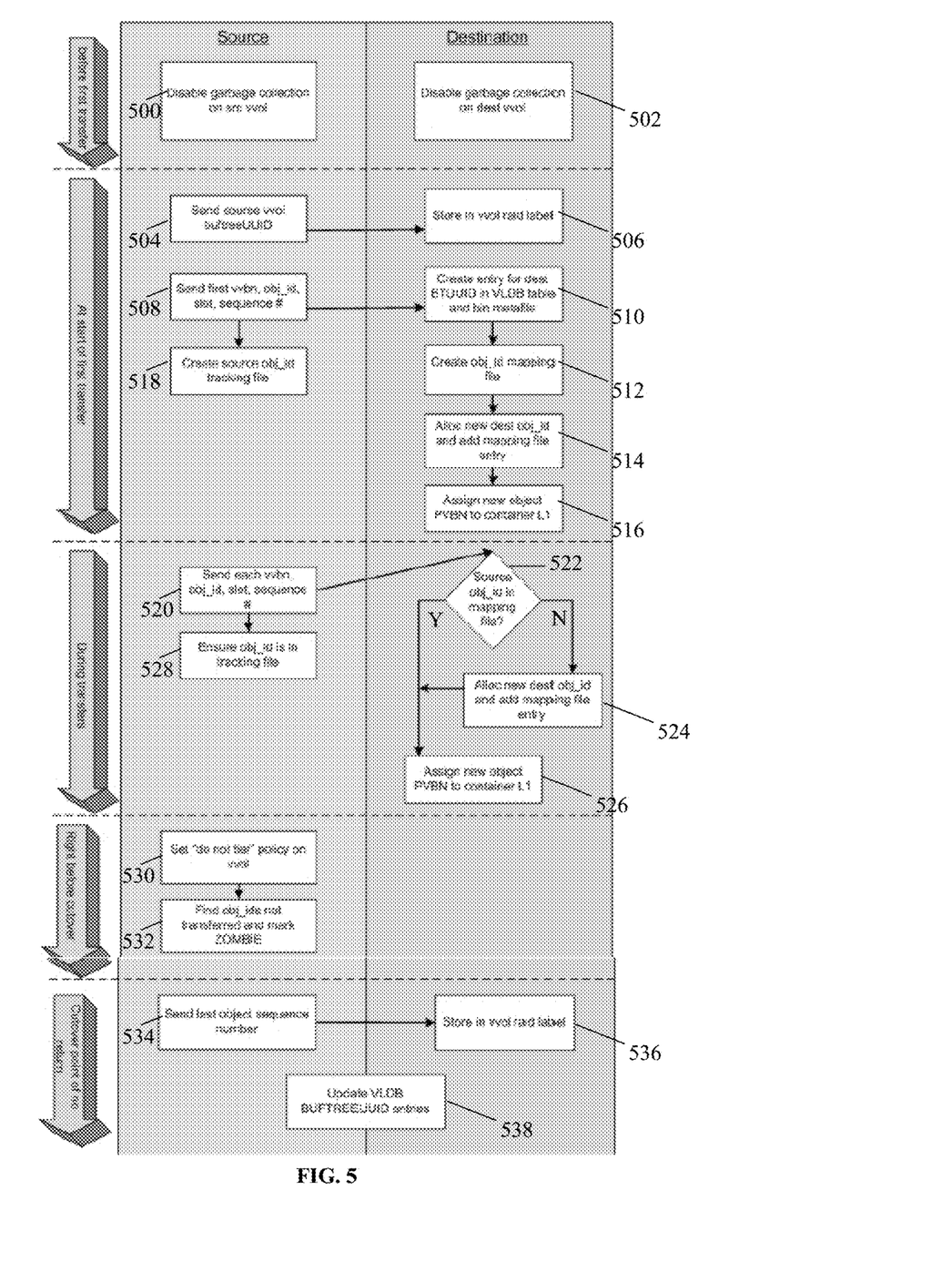
FIG. 5 is a timing diagram of an exemplary method for facilitating improved data store migrations without physically moving data stored therein.

Referring to FIGS. 1, 2, and 5, a timing diagram of an exemplary method for facilitating improved data store migrations, without physically moving data stored therein, is illustrated. In step 500 in this example, the source node 116 optionally disables garbage collection so as to avoid freeing blocks during the transfer of the source volume 138.

In step 502, the destination node 118 also optionally disables garbage collection on the destination volume 140. The destination node 118 can receive a notification that a volume is to be transferred from the source node 116 or from an administrator device, for example. The destination volume 140 can be a storage volume generated in response to the notification or an existing storage volume. In this particular example, the source composite aggregate 132 associated with the source volume 138 and the destination composite aggregate 134 associated with the destination volume 140 each include data in a respective local storage (e.g., data storage device(s) 128 and 138) and a same remote cloud repository (e.g., the cloud storage device(s) 136).

In step 504, the source node 116 sends a source volume identifier for the virtual source volume 138 ("buftreeUUID") to the destination node 118. In step 506, the destination node 118 stores the source volume identifier in a virtual volume ("vvol") RAID label, although the source volume identifier can be stored elsewhere in other examples.

In step 508, the source node 116 sends metadata for a first block associated with an object in the source volume 138 to the destination node 118. In this particular example, the metadata includes a virtual volume block number ("vvbn"), a source object identifier ("obj_id"), a slot number corresponding to an offset for the block within the associated object, and a sequence number, although other types of metadata can also be sent to the destination node 118.

In step 510, the destination node 118 in this example creates an entry for the source volume identifier in the cluster-wide database ("VLDB table") in order to indicate that ownership is currently shared for the source volume 138. Next, in step 512, the destination node 118 creates the object mapping file 211 in order to maintain a mapping of source object identifiers to destination object identifiers.

In step 514, the destination node 118 allocates a new destination object identifier for the block associated with the metadata sent in step 508. The destination node 118 also extracts the source object identifier from the metadata and inserts a mapping in the object mapping file 211 of the destination object identifier to the source object identifier.

In step 516, the destination node 118 assigns a new aggregate block number ("PVBN") to a hierarchical level ("L1") associated with the destination volume 140. The aggregate block number in this example includes the destination object identifier and the slot number or offset, which uniquely identifiers the particular block currently being transferred.

In step 518, the source node 116 optionally creates the object tracking file 213 and inserts the source object identifier into the object tracking file 213. The object racking file 42 can be used to identify objects within the source volume 138 that were not transferred (e.g., due to being deleted subsequent to initiation of the transfer).

In step 520, the source node 116 sends metadata for another block associated with the same or another object to the destination node 118. Since blocks may be sent in a random order or out-of-order with respect to particular objects, the destination node 118 advantageously utilizes the object mapping file 211 to identify destination object identifiers and appropriately assign aggregate block numbers.

Accordingly, in step 522, the destination node 118 determines whether the source object identifier, extracted from the metadata sent in step 520, was previously inserted into the object mapping file 211 as associated with a destination object identifier. If the destination node 118 determines that there is not a match of the source object identifier in the object mapping file 211, then the No branch is taken to step 524.

In step 524, the destination node 118 allocates a new destination object identifier and adds an entry to the object mapping file 211 that includes the destination object identifier as associated with the source object identifier extracted from the metadata sent in step 520, as described and illustrated earlier with reference to step 514. However, if the destination node 118 determines that there is a match of the source object identifier in the object mapping file 211, then the Yes branch is taken to step 526.

In step 526, the destination node 118 assigns a new aggregate block number within the destination volume 140. The aggregate block number includes the destination object identifier and the slot number in this example, as described and illustrated earlier with reference to step 516.

In step 528, the source node 116 optionally determines whether the source object identifier in the metadata sent in step 520 is included in the object tracking file 213. If the source object identifier was not previously inserted into the object tracking file 213, then the source node 116 inserts the source object identifier into the object tracking file 213.

In this example, steps 520-528 are repeated until a determination is made to cutover. Once a determination is made to cutover, the source node 116, in step 530 in this example, sets a "do not tier" policy on the source volume 138 in order to stop creating new objects in the source volume 138 in response to storage operations received from the host device 108.

In step 532, the source node 116 optionally identifies source object identifiers in the source volume 138 that were not transferred based on a comparison with the object tracking file 213. The identified source object identifiers are marked to be freed (e.g., as "zombies") in order to facilitate efficient garbage collection with respect to the source volume 138 subsequent to transfer of the ownership of the source volume 138 to the destination node 118.

In step 534, the source node 116 optionally sends a last object sequence number for the source storage volume so that the destination node 118 can determine where to begin assigning sequence numbers to new objects subsequent to the transfer of the source volume in order to avoid overwriting. In step 536, the destination node 118 optionally stores the last sequence number in the vvol RAID label, although the last sequence number can also be stored elsewhere.

In step 538, the source node 116 and/or the destination node 118 updates the cluster-wide database to reflect a change in ownership of the source volume 138 to the destination node 118 based on the source volume identifier. Other methods of transferring the ownership can also be used in other examples.

Accordingly, with this technology, storage volumes can be transferred without physically transferring any user data that may otherwise require a read and copy from relatively slow and monetarily expensive storage locations, such as cloud storage devices. Advantageously, this technology facilitates volume transfer using only metadata associated with the data of the volume, and facilitates appropriate and accurate aggregate block numbers at a destination for each block associated with each object of a source storage volume.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
    receiving, by a computing device, metadata for a block associated with an object from a source storage node, wherein the metadata comprises at least a source object identifier and the object is associated with a source volume of a source aggregate owned by the source storage node;
    determining, by the computing device, when another block associated with the object has been previously received and obtaining a destination object identifier based on the source object identifier, when the determining indicates that the other block associated with the object has been previously received;
    assigning, by the computing device, a new aggregate block number to the block based on the destination object identifier and another portion of the metadata; and
    transferring, by the computing device, ownership of the source volume upon receipt of an indication of a cutover from the source storage node in order to migrate the source volume to a destination volume of a destination aggregate without moving any user data.

2. The method of claim 1, wherein the source aggregate and the destination aggregate comprise composite aggregates each comprising data in a respective local storage and a same remote cloud repository.

3. The method of claim 1, further comprising generating, by the computing device, another destination object identifier and inserting the other destination object identifier into an object mapping file as associated with the source object identifier, when the determining indicates that another block associated with the object has not been previously received.

4. The method of claim 1, wherein the source and destination aggregates are associated with a same cluster and the method further comprises:
    receiving, by the computing device, a source volume identifier for the source volume prior to receiving the metadata for the block; and updating, by the computing device, an entry of a database of the cluster associated with the source volume identifier in order to transition ownership of the source volume.

5. The method of claim 1, wherein the other portion of the metadata comprises an offset within the object associated with the block.

6. The method of claim 1, wherein the source volume comprises a plurality of objects including the object, the objects are associated with monotonically increasing sequence numbers, and the indication of the cutover comprises an indication of a last one of the sequence numbers for the source volume.

7. A non-transitory machine readable medium having stored thereon instructions for improved data store migrations comprising machine executable code which when executed by at least one machine causes the machine to:
   receive metadata for a block associated with an object from a source storage node, wherein the metadata comprises at least a source object identifier and the object is associated with a source volume of a source aggregate owned by the source storage node;
   determine when another block associated with the object has been previously received and obtain a destination object identifier based on the source object identifier, when the determining indicates that the other block associated with the object has been previously received;
   assign a new aggregate block number to the block based on the destination object identifier and another portion of the metadata; and
   transfer ownership of the source volume upon receipt of an indication of a cutover from the source storage node in order to migrate the source volume to a destination volume of a destination aggregate without moving any user data.

8. The non-transitory machine readable medium of claim 7, wherein the source aggregate and the destination aggregate comprise composite aggregates each comprising data in a respective local storage and a same remote cloud repository.

9. The non-transitory machine readable medium of claim 7, wherein the machine executable code when executed by the machine further causes the machine to generate another destination object identifier and inserting the other destination object identifier into an object mapping file as associated with the source object identifier, when the determining indicates that another block associated with the object has not been previously received.

10. The non-transitory machine readable medium of claim 7, wherein the source and destination aggregates are associated with a same cluster and the machine executable code when executed by the machine further causes the machine to:
   receive a source volume identifier for the source volume prior to receiving the metadata for the block; and
   update an entry of a database of the cluster associated with the source volume identifier in order to transition ownership of the source volume.

11. The non-transitory machine readable medium of claim 7, wherein the other portion of the metadata comprises an offset within the object associated with the block.

12. The non-transitory machine readable medium of claim 7, wherein the source volume comprises a plurality of objects including the object, the objects are associated with monotonically increasing sequence numbers, and the indication of the cutover comprises an indication of a last one of the sequence numbers for the source volume.

13. A computing device, comprising:
   a memory containing machine readable medium comprising machine executable code having stored thereon instructions for facilitating planned data container transitions; and
   a processor coupled to the memory, the processor configured to execute the machine executable code to cause the processor to:
      receive metadata for a block associated with an object from a source storage node, wherein the metadata comprises at least a source object identifier and the object is associated with a source volume of a source aggregate owned by the source storage node;
      determine when another block associated with the object has been previously received and obtain a destination object identifier based on the source object identifier, when the determining indicates that the other block associated with the object has been previously received;
      assign a new aggregate block number to the block based on the destination object identifier and another portion of the metadata; and
      transfer ownership of the source volume upon receipt of an indication of a cutover from the source storage node in order to migrate the source volume to a destination volume of a destination aggregate without moving any user data.

14. The source storage node computing device of claim 13, wherein the source aggregate and the destination aggregate comprise composite aggregates each comprising data in a respective local storage and a same remote cloud repository.

15. The source storage node computing device of claim 13, wherein the processor is further configured to execute the machine executable code to further cause the processor to generate another destination object identifier and inserting the other destination object identifier into an object mapping file as associated with the source object identifier, when the determining indicates that another block associated with the object has not been previously received.

16. The source storage node computing device of claim 13, wherein the source and destination aggregates are associated with a same cluster and the processor is further configured to execute the machine executable code to further cause the processor to:
   receive a source volume identifier for the source volume prior to receiving the metadata for the block; and
   update an entry of a database of the cluster associated with the source volume identifier in order to transition ownership of the source volume.

17. The source storage node computing device of claim 13, wherein the other portion of the metadata comprises an offset within the object associated with the block.

18. The source storage node computing device of claim 13, wherein the source volume comprises a plurality of objects including the object, the objects are associated with monotonically increasing sequence numbers, and the indication of the cutover comprises an indication of a last one of the sequence numbers for the source volume.

* * * * *